US009150303B2

(12) United States Patent
Guida et al.

(10) Patent No.: US 9,150,303 B2
(45) Date of Patent: Oct. 6, 2015

(54) CONTROL QUADRANT

(75) Inventors: Nicholas R. Guida, Sagle, ID (US);
Dieter Koehler, Powell Butte, OR (US);
Haldan R. Gates, Sandpoint, ID (US);
Stephen L. Babin, Spirit Lake, ID (US);
Dwight W. Mitchell, Sandpoint, ID (US); Chase Hrdina, Columbia, MO (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 284 days.

(21) Appl. No.: 13/571,573

(22) Filed: Aug. 10, 2012

(65) Prior Publication Data

US 2013/0037659 A1 Feb. 14, 2013

Related U.S. Application Data

(60) Provisional application No. 61/522,036, filed on Aug. 10, 2011.

(51) Int. Cl.
*B64C 13/28* (2006.01)
*B64D 31/04* (2006.01)
*B64D 31/14* (2006.01)
*B64C 11/30* (2006.01)

(52) U.S. Cl.
CPC ............ *B64C 11/30* (2013.01); *B64D 31/04* (2013.01); *B64C 13/28* (2013.01); *B64D 31/14* (2013.01); *Y10T 29/49716* (2015.01); *Y10T 74/20012* (2015.01)

(58) Field of Classification Search
CPC ........ B64C 19/00; B64C 19/02; B64C 13/02;
B64C 13/04; B64C 13/28; B64D 31/00;
B64D 31/02; B64D 31/04; B64D 31/14
USPC ............... 244/234, 232, 221, 220, 99.3, 99.2
See application file for complete search history.

(56) References Cited

U.S. PATENT DOCUMENTS

| | | | | |
|---|---|---|---|---|
| 2,242,314 A | * | 5/1941 | Martin et al. | 244/220 |
| 2,359,392 A | * | 10/1944 | Shoemaker | 74/516 |
| 2,382,330 A | * | 8/1945 | Pain | 74/531 |
| 2,406,273 A | * | 8/1946 | Waite | 74/471 R |
| 2,417,691 A | * | 3/1947 | Kelley et al. | 244/234 |
| 2,421,494 A | * | 6/1947 | Glass et al. | 74/471 R |
| 3,675,880 A | * | 7/1972 | Koch | 244/234 |
| 5,488,824 A | | 2/1996 | LeDoux et al. | |
| 6,488,239 B2 | | 12/2002 | Spitzer | |
| 7,350,750 B2 | | 4/2008 | Beaujard et al. | |

OTHER PUBLICATIONS

The PCT Search Report mailed Feb. 1, 2013 for PCT application No. PCT/US12/50266, 10 pages.

* cited by examiner

*Primary Examiner* — Tien Dinh
*Assistant Examiner* — Richard R Green
(74) *Attorney, Agent, or Firm* — Lee & Hayes, PLLC

(57) ABSTRACT

An aircraft with a control system having joint control for a throttle and a propeller of an aircraft may be modified to decouple the joint control of a throttle and a propeller. Control of the throttle and propeller may be independent of the other. Exemplary modification of a control system may use new structures, existing structures, repurpose existing structures, or use a combination thereof. Additionally or alternatively, modification of a control system may provide controls with tactile distinction to a user.

20 Claims, 14 Drawing Sheets

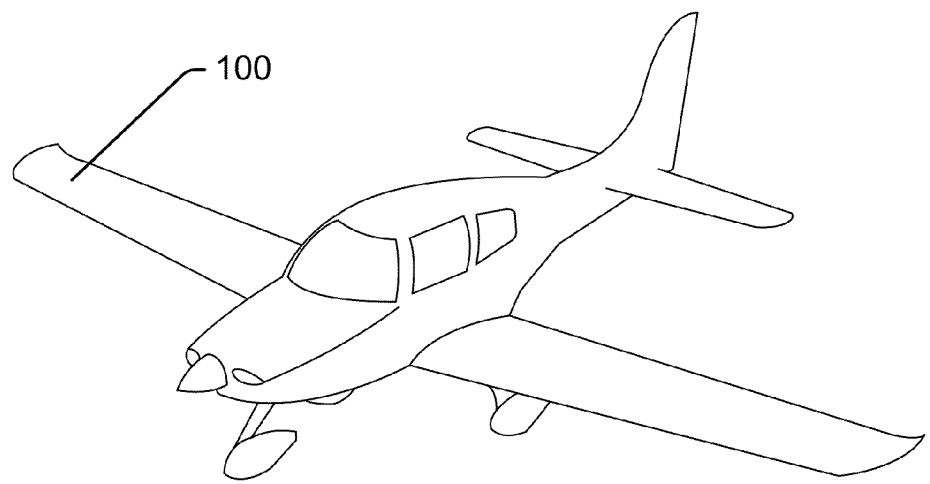
Fig. 1A SR20
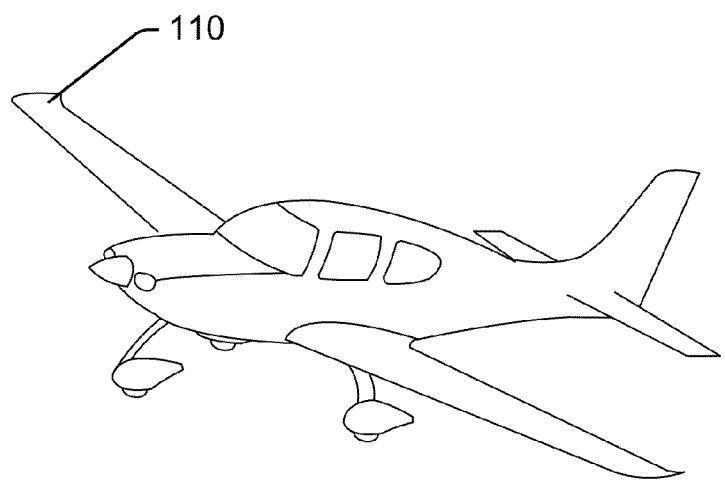
Fig. 1B SR22

CONTROL QUADRANT

CROSS REFERENCE TO RELATED PATENT APPLICATIONS

This patent application claims the benefit of U.S. Provisional Application No. 61/522,036, filed Aug. 10, 2011, which provisional application is hereby incorporated in its entirety by reference.

BACKGROUND

Aircraft may be propelled by various methods including the use of propellers. A pilot may control the propulsion system of an aircraft through various control interfaces. A pilot's interaction with the control interfaces are normally governed and constrained by the type, style, and distribution of the control interfaces as set by the aircraft manufacturer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes control system modification of aircraft with a joint control for a throttle and a propeller of an aircraft. Additionally or alternatively, this disclosure discusses structures and techniques to decouple joint control of a throttle and a propeller. Additionally or alternatively, this disclosure discusses structures and techniques to control the throttle and propeller independently of the other. Additionally or alternatively, this disclosure discusses control system modification using new structures, existing structures, repurposing of existing structures, or a combination thereof. Additionally or alternatively this disclosure discuses modifying control systems to provide a tactile distinction to a user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 1A-1B depict images of illustrative aircraft.

DETAILED DESCRIPTION

Overview

Figure 2:
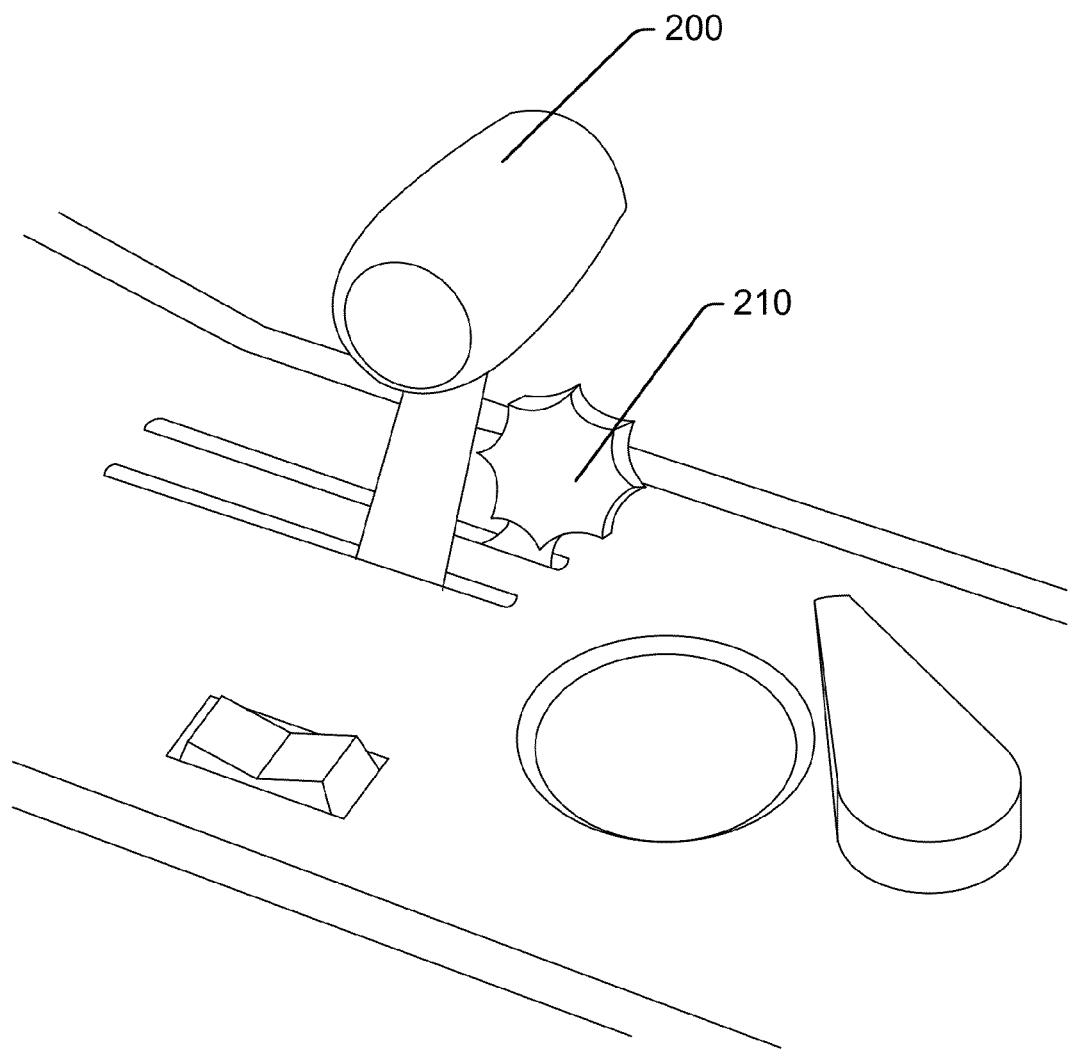
FIG. 2 depicts a illustrative control quadrant of the aircraft of FIGS. 1A-1B as configured by the original equipment manufacturer.

Aircraft may be propelled by various methods including the use of propellers. Some propeller driven aircraft use what is often called a constant speed propeller, also known as a variable pitch propeller. In such cases, the pitch of the propeller may be adjusted in conjunction with the throttle to provide desired flight and performance characteristics. In some aircraft, the throttle and the propeller controls have been integrated into one control that a pilot may manipulate. This direct coupling of the throttle to the propeller simplifies operation of the aircraft by providing one propeller setting for a given throttle position. Often, however, it is desirable for a pilot to control the throttle and the propeller independently of each other. For instance, independent control may allow the pilot to set the aircraft to achieve better fuel consumption than it would by way of the restricted coupled arrangement.

The Cirrus Design SR-20 and SR-22 aircraft is an example of an aircraft having a direct coupling of the throttle to propeller. As delivered by the manufacturer, these SR-20 and SR-22 aircraft use a single lever to control the throttle and propeller rotations per minute (RPM). The propeller RPM is controlled by controlling the pitch of the propeller in conjunction with the manifold pressure of the engine. The relationship between the propeller's pitch, propeller RPM, and manifold pressure is beyond the scope of this discussion. A second lever controls the mixture.

One possible embodiment of the subject matter is a modification (or retrofit kit) which provides separate controls for each of the throttle, propeller, and mixture.

One possible embodiment of the subject matter is a system installed in certain Cirrus SR20 and SR22 aircraft which provides an additional engine control lever, new center console markings, and a new LED indication light linked to the fuel pump condition.

One possible illustrative embodiment of the subject matter is a kit installed in select Cirrus SR20 and SR22 aircraft for the purpose of providing an additional engine/propeller control lever for use during flight.

Pilots may find the coupled throttle-propeller control frustrating because it limits their ability to obtain optimal engine efficiency. One possible illustrative embodiment of the subject matter is a system that removes the existing mechanical linkage between propeller RPM control and throttle control, separating this control into two separate control levers.

One of the possible benefits of at least one aspect of the subject matter allows the pilot to control the throttle and propeller RPM individually so that optimal engine efficiency can be achieved. This is typical of most aircraft equipped with constant speed propellers.

The ability to precisely control both throttle and propeller RPM settings may result in a reduction in fuel consumption of approximately ten percent (10%). This is possible because the engine is operated at lower RPM which, in turn, reduces engine wear. The ability to select lower RPM settings for the propeller may also result in reduced cabin noise and vibration.

Additional information about the Cirrus aircraft and regulations applicable to the Cirrus, among other, aircraft may be found in the following documents: Cirrus SR20/SR22 Illustrated Parts Catalogue, Cirrus SR20/SR22 Aircraft Maintenance Manual, Cirrus SR20/SR22 Pilot's Operating Handbook, 14 C.F.R. §§21 and 23 (also commonly referred to as Federal Aviation Regulations (FAR) 21 and 23).

Illustrative Aircraft and Control Quadrant Embodiments

FIGS. 1A and 1B depict images of illustrative aircraft suitable for the modifications described herein. These include, for example, the Cirrus SR20 100 and the Cirrus SR22 110 aircraft, collectively referred to herein as "SR2X." This line of Cirrus aircraft comprise a four-seat piston composite aircraft with fixed landing gear and constant speed propellers. The aircraft are marketed as comfortable long distance cruisers, designed for the general aviation sector. General aviation airplanes or aircraft may include aircraft operated that are not designated as military aircraft and are not aircraft regularly scheduled for commercial flights.

Additional information about the Cirrus aircraft and aircraft operating similar engines as those found on the Cirrus aircraft may be found in the following documents: Cirrus SR20/SR22 Illustrated Parts Catalogue, Cirrus SR20/SR22 Aircraft Maintenance Manual, Cirrus SR20/SR22 Pilot's Operating Handbook, and Columbia 350/400 Pilot's Operating Handbook.

These aircraft are illustrative examples of aircraft that come from the manufacturer with a combined throttle and propeller control 200 as shown in FIG. 2. FIG. 2 depicts an illustrative engine control quadrant of a Cirrus aircraft as it comes from the manufacturer. The control quadrant includes the combined throttle and propeller control 200. Adjacent to and running parallel to the combined throttle and propeller control 200 is the mixture control 210.

Specifically, Cirrus aircraft feature a two-lever engine control quadrant, with one lever 210 controlling the mixture and the other 200 controlling both throttle and propeller RPM via a linked governor system. The combined throttle and power controls reflect a marketing decision on the part of the Original Equipment Manufacturer (OEM), similar to the single-lever operation of the Mooney M20L PFM variant. Mooney returned the M20 to a traditional three-control configuration in subsequent variants. Preliminary research suggests that the consolidated combination of controls may prevent the pilot from selecting the optimal manifold pressure and propeller RPM combination, limiting efficiency. Research also indicates that many pilots qualitatively prefer a traditional three-lever engine control setup.

One of the possible benefits of at least one aspect of the subject matter allows the pilot to control the throttle and propeller RPM individually so that optimal engine efficiency can be achieved. This is typical of most fixed wing, propeller driven, transport and civilian aircraft.

Possible embodiments of the subject matter may be specifically applicable to all serial numbers of SR20 prior to 2016 and all serial numbers of SR22 prior to 3026. After these serial numbers, changes to the power lever may affect the installation of the third lever, however, they are still within the scope of the disclosed subject matter. Serial numbers more recent than these limits without the Perspective avionics package do not have the redesigned power lever, and are thus within the scope of the disclosed subject matter.

One of the possible embodiments of the subject matter applies to the engine control quadrant and throttle/RPM control mechanisms. Modifications to the engine itself or the propeller assembly may not be needed. The propeller high RPM stop may be unchanged, as may both stops of the throttle. The low RPM stop may be adjusted, for example, to restrict the RPM lever travel to keep the lever from hitting the rear of the console slot. Changes to normal procedures may include the addition of a manual prop RPM selection item. Takeoff and cruise configurations for at least one embodiment of the subject matter may replicate the configurations available from the OEM setup. As such, recalculation of performance or noise data for the aircraft may be consistent with the OEM's configuration's data.

Figure 3:
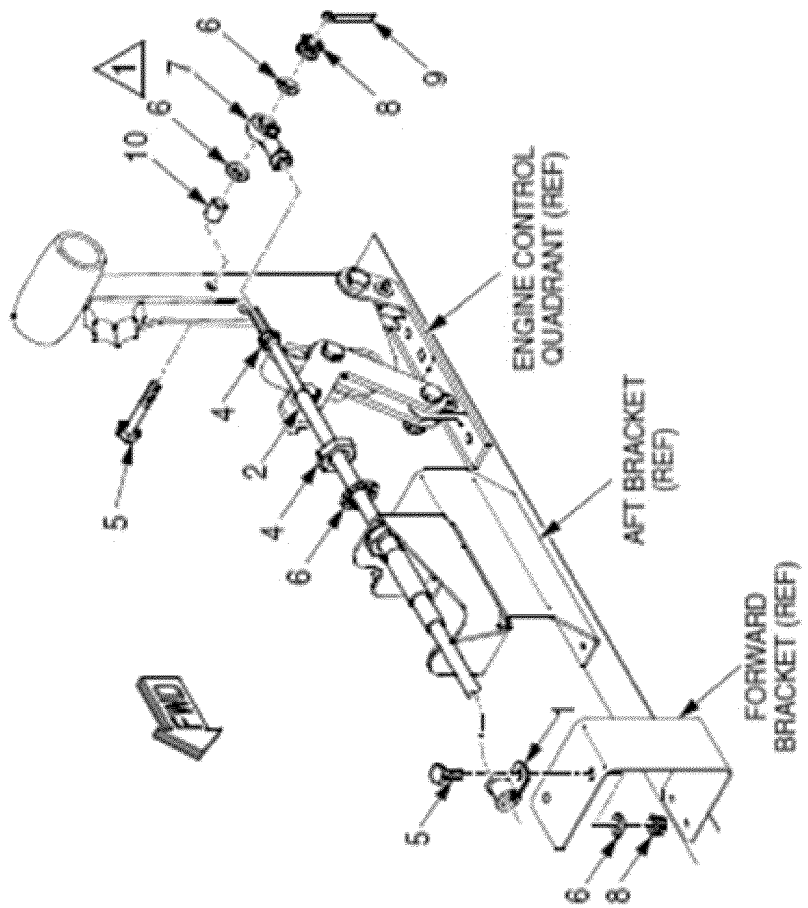
FIG. 3 is an exploded view of the control quadrant of FIG. 2.
Figure 4:
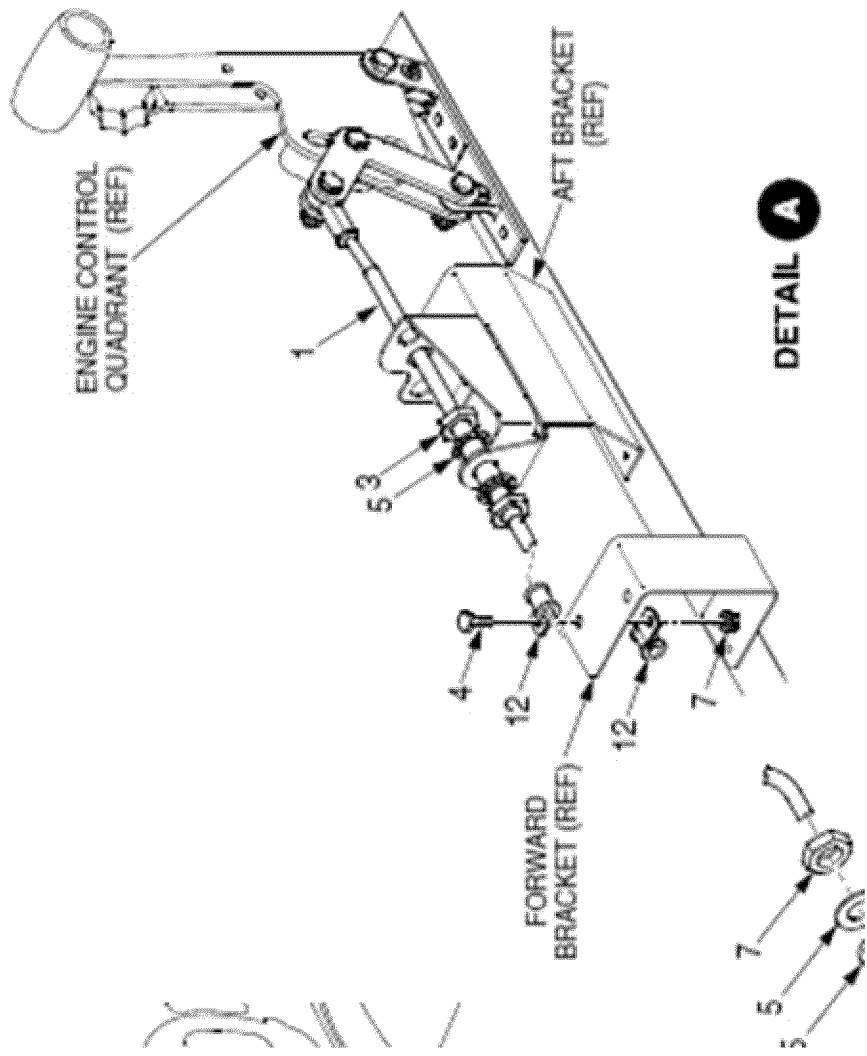
FIG. 4 is an exploded view of the control quadrant of FIG. 2.

At least one possible embodiment of the subject matter may replace the existing throttle/RPM linked cable system with separate controls, providing separate control inputs for controlling prop RPM and throttle. FIGS. 3 and 4 show two views of the power lever mechanism as configured by the OEM. FIG. 3 shows the connection between the power lever and the throttle cable. FIG. 4 shows the connection between the propeller governor cable and the power lever.

Figure 5:
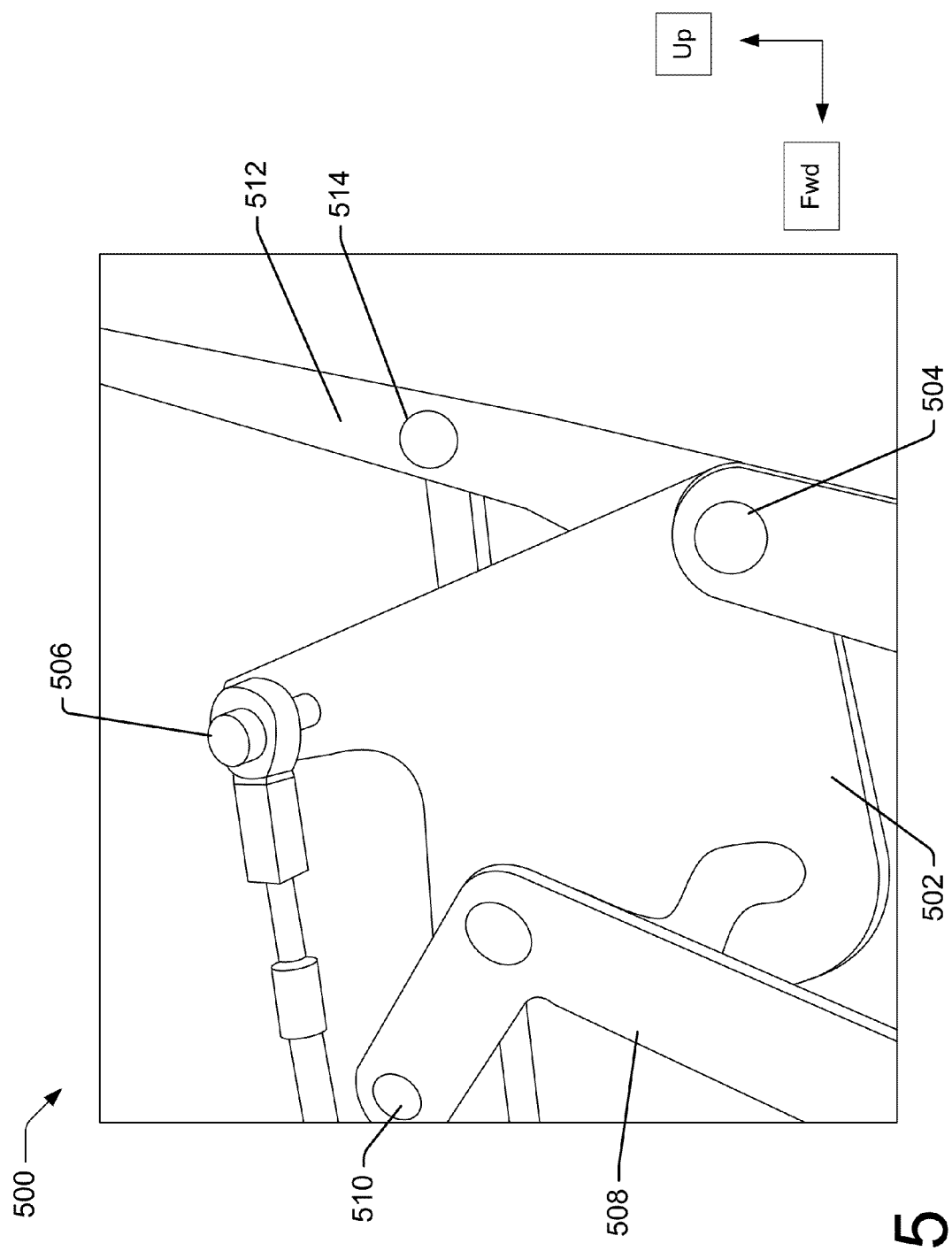
FIG. 5 depicts an image the control quadrant of FIG. 2.

FIG. 5 depicts an illustrative lever assembly, here a SR22 lever assembly, from the pilot's side including a throttle lever assembly 500 with a combined throttle and RPM control, designated herein as original power lever 502, coupled to the throttle (not pictured) through a throttle control member at a throttle attachment 506 and the common pivot 504 which may also be described as a pivot member. The original power lever 502 is also coupled to the original cam followers 508 which is coupled to the propeller RPM (not pictured) through a propeller control member at the propeller RPM attachment 510. The common pivot 504 is also coupled to the mixture control 512 which in turn is coupled to the mixture (not pictured) through a mixture control member at mixture attachment 514.

Illustrative Control Quadrant

Figure 6A:
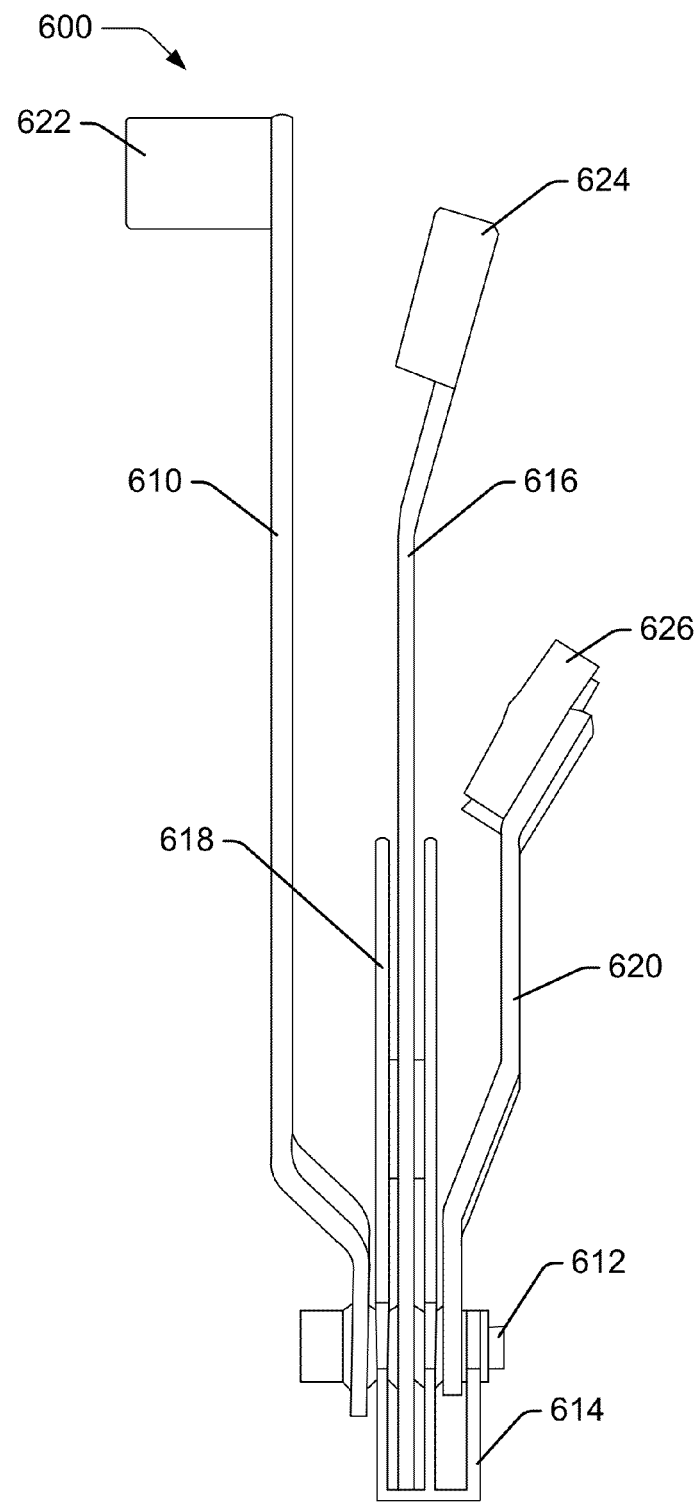
FIG. 6A is an aft view of an illustrative modified, three lever control quadrant.
Figure 6B:
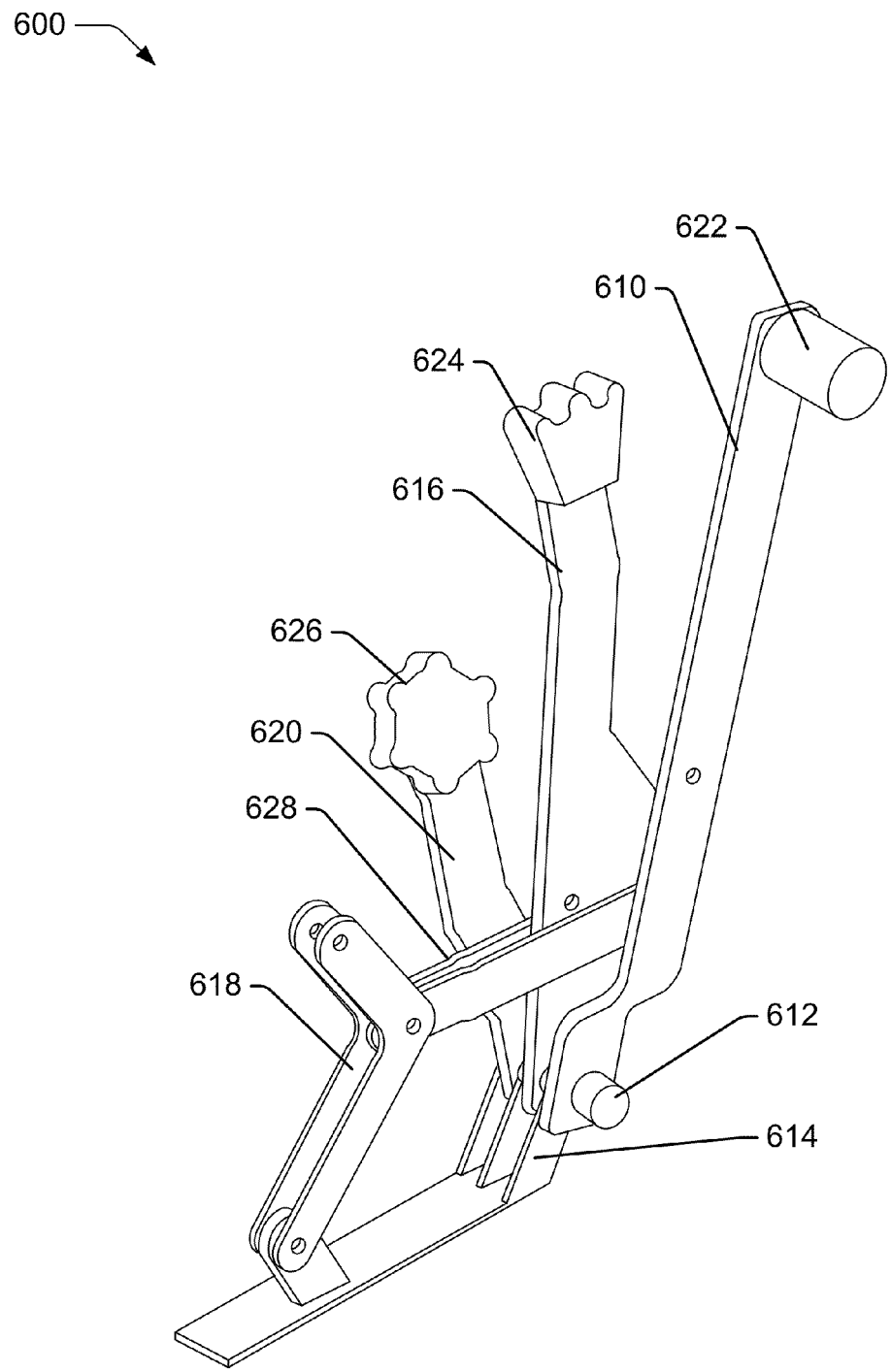
FIG. 6B is an isometric view of the illustrative control quadrant of FIG. 6A.

FIGS. 6A and 6B depict at least one possible embodiment of the subject matter. This includes control quadrant 600 comprised of a base 614 coupleable to an aircraft. The base 614 may be coupled to a pivot 612. Coupled to and rotatable about the pivot 612 may be several controls including a throttle lever 610 with a throttle knob 622, a propeller lever 616 with a propeller knob 624, and a mixture lever 620 with a mixture knob 626.

One possible embodiment of the subject matter may include the replacement of the original power lever 502 with a redesigned propeller RPM lever 616 coupleable to the original cam followers 508 to be used as cable actuation arms 618 by way of linkage plates 628. A built-up linkage may connect the new RPM lever 616 to the governor system (not pictured). The throttle lever 610 may be attached to the outside of the mounting bracket or base 614 on the pilot's side. A view is provided in FIGS. 6A and 6B. It is noted that the control knobs visible in these figures are an example and additional knob styles, shapes, colors, and configurations may be used. One possible embodiment of the subject matter is that the knobs may all be shaped in unique shapes to allow identification by a pilot by feel alone. Another possible embodiment of the subject matter is that the knobs may be all colored in unique colors to allow identification by a pilot by sight alone. Additionally, the unique identification of each may be by a combination of both sight and feel.

Figure 7:
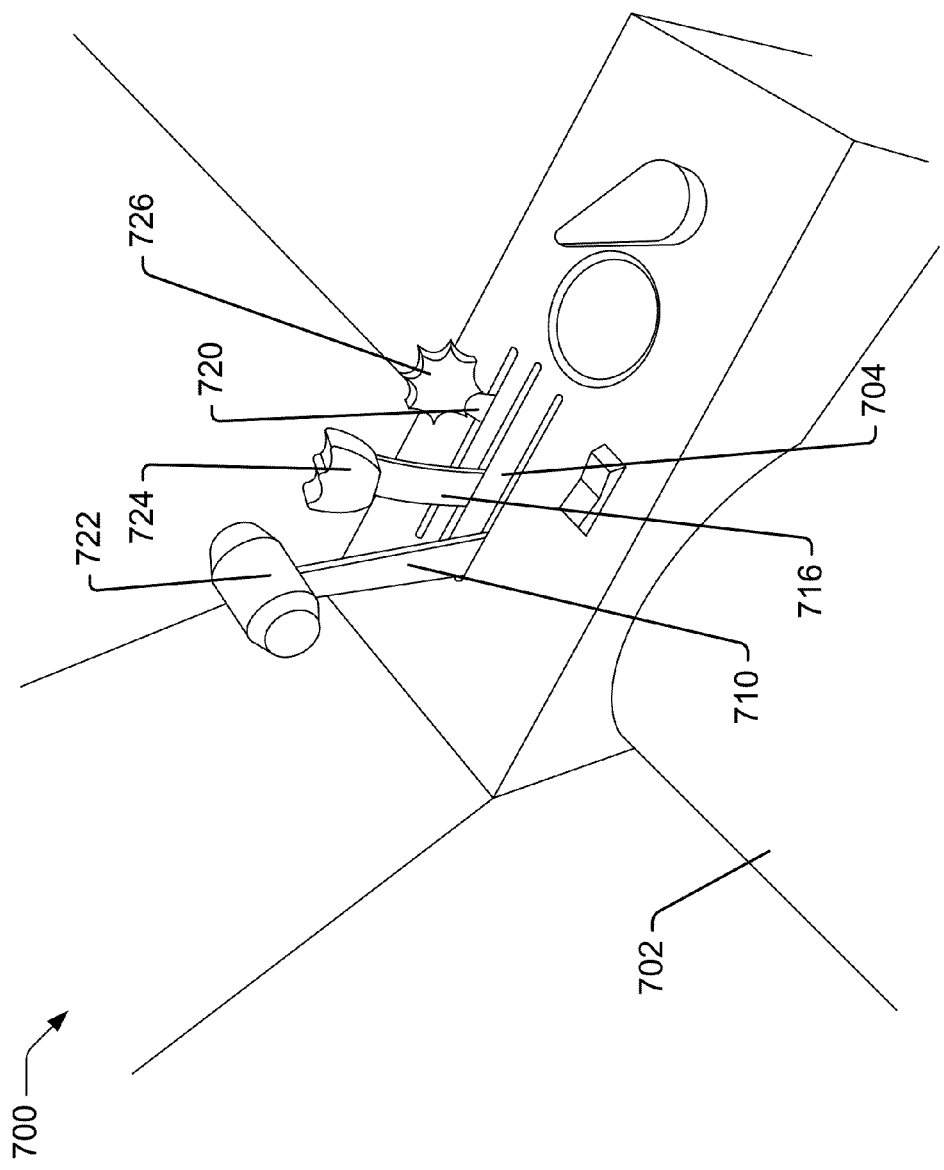
FIG. 7 depicts an image of an illustrative, three lever control quadrant installed in an aircraft.

FIG. 7 depicts an embodiment of the subject matter including a control quadrant installation 700 installed in an aircraft flight deck 702. The three-lever engine control quadrant 704 includes a throttle lever 710 with a throttle knob 722. Adjacent and moveable parallel to the throttle lever 710 is the propeller lever 716 with propeller knob 724. Adjacent and moveable parallel to the propeller lever 716 is the mixture lever 720 with mixture knob 726.

Figure 8:
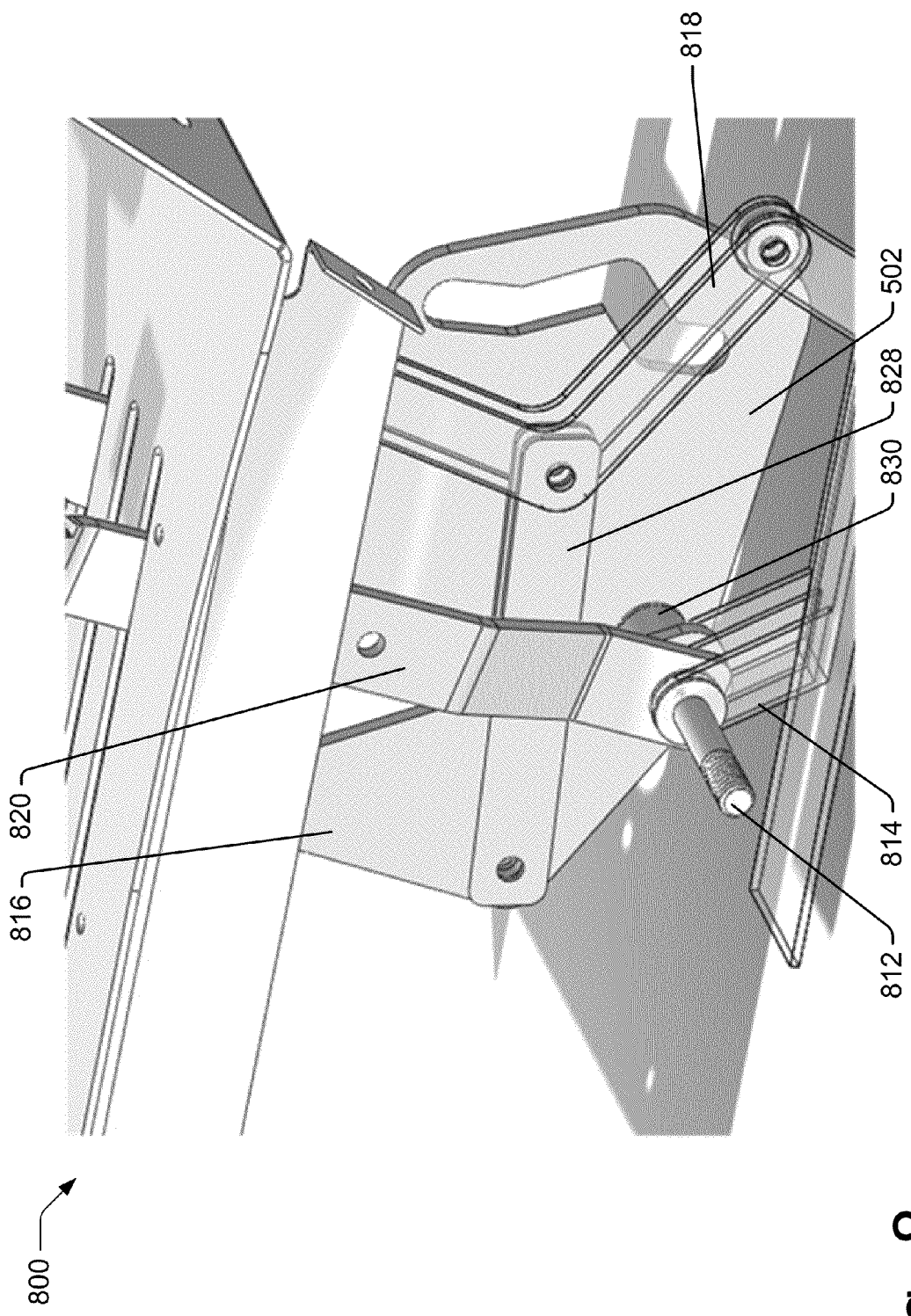
FIG. 8 is isometric view of an illustrative modified, three lever control quadrant.

FIG. 8 depicts an embodiment of the subject matter including a control quadrant 800 comprised of a base 814 coupled to a pivot 812. The pivot 812 may be coupled to the original power lever 502 where the original power lever 502 has been relocated outboard from the original position with respect to base 814. The original power lever 502 may be pivotably coupled to pivot 812 with a spacer 830 disposed between the original power lever 502 and the base 814. A new RPM lever 816 may also be coupled to the base 814 by way of and pivotable about the pivot 812. Coupled to the new RMP lever 816 may be linkages. The linkages may take the form of linkage plates 828, linkages, rods, other suitable structures, or combinations thereof. Linkage plates 828 may be coupled to cable actuation arms 818. Cable actuation arms 818 may comprise, for example, the original cam followers 508. A mixture lever 820 may also be pivotably coupled to pivot 812.

Figure 9:
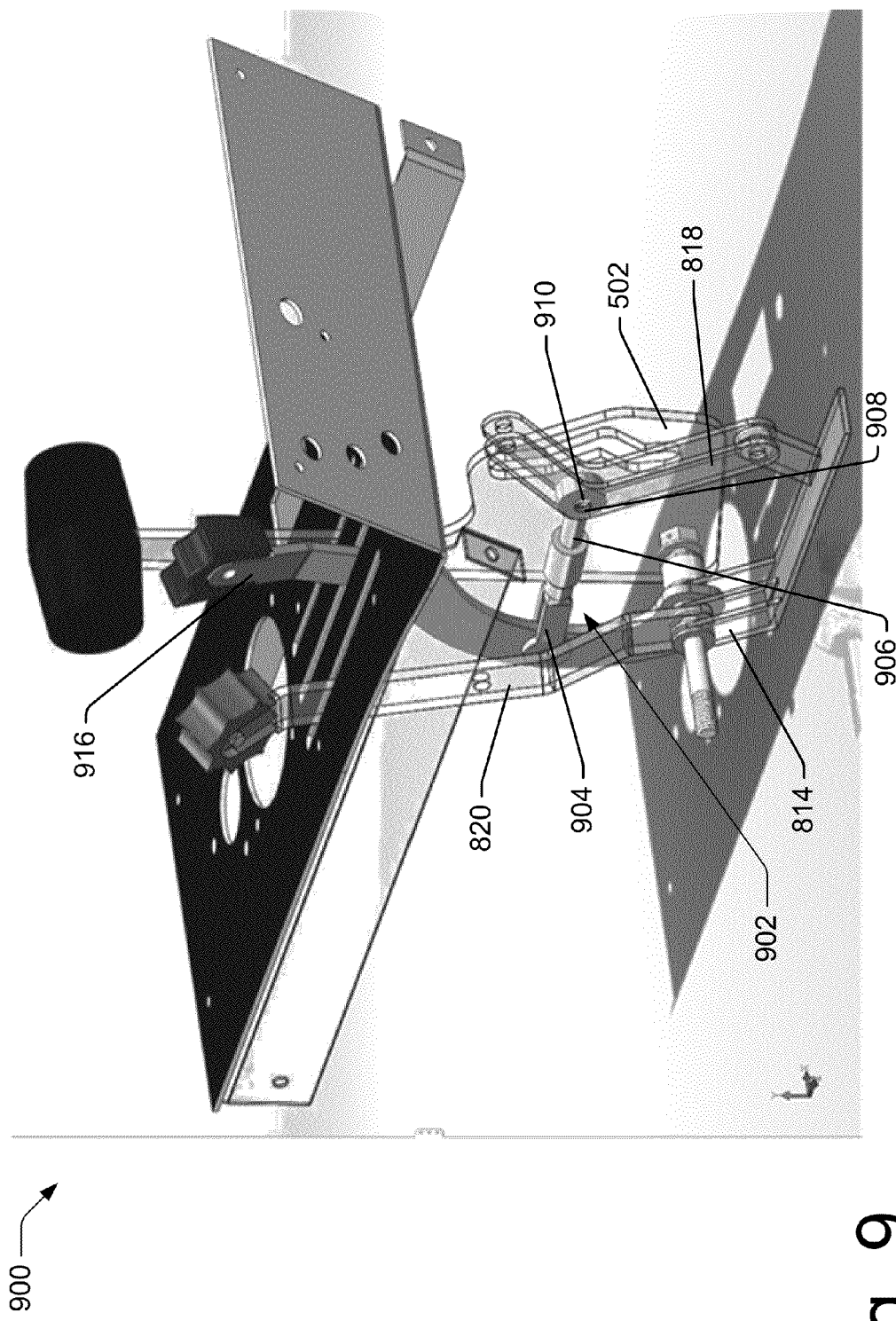
FIG. 9 is isometric view of an illustrative modified, three lever control quadrant.
Figure 10:
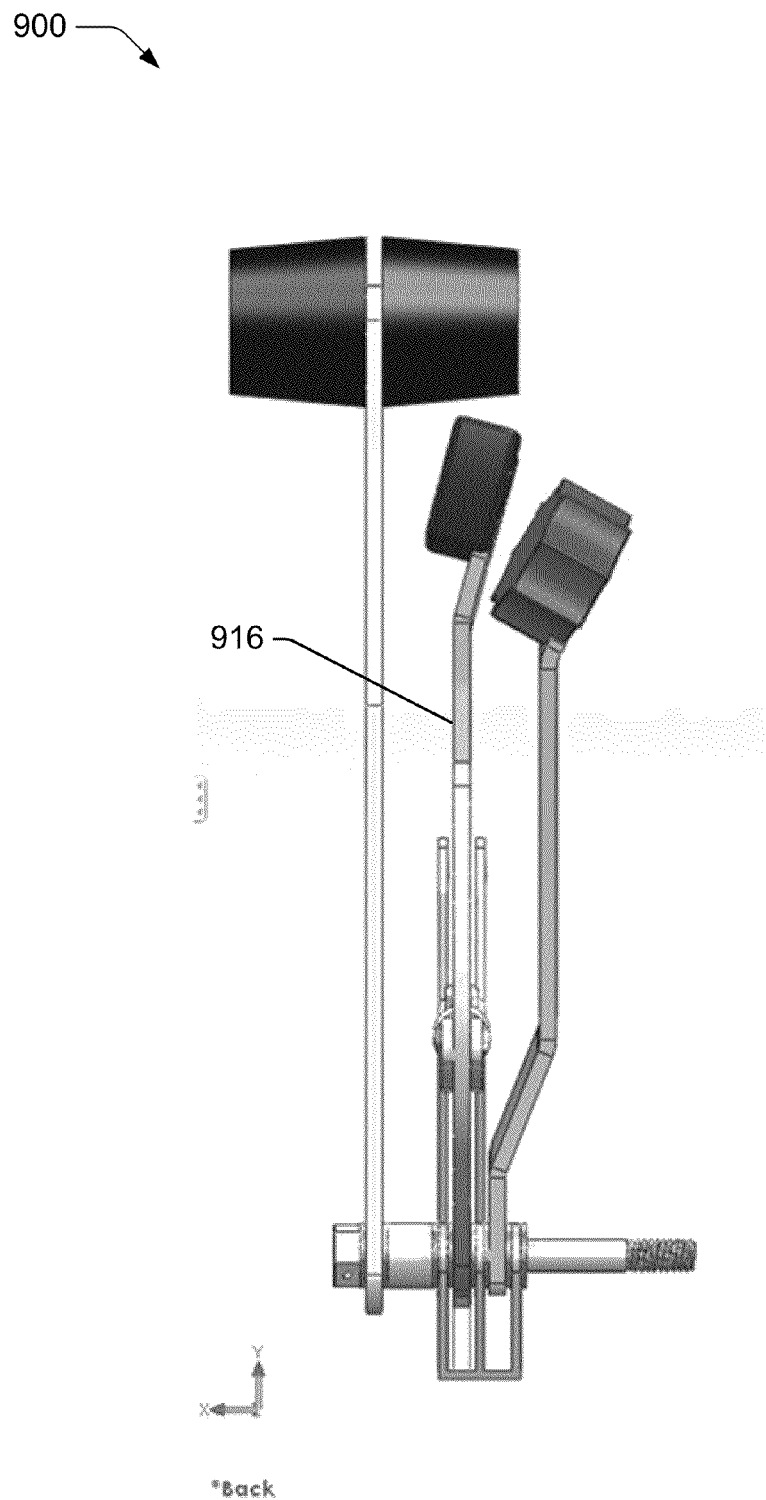
FIG. 10 shows a view from the rear of the illustrative modified, three lever control quadrant of FIG. 9.
Figure 11:
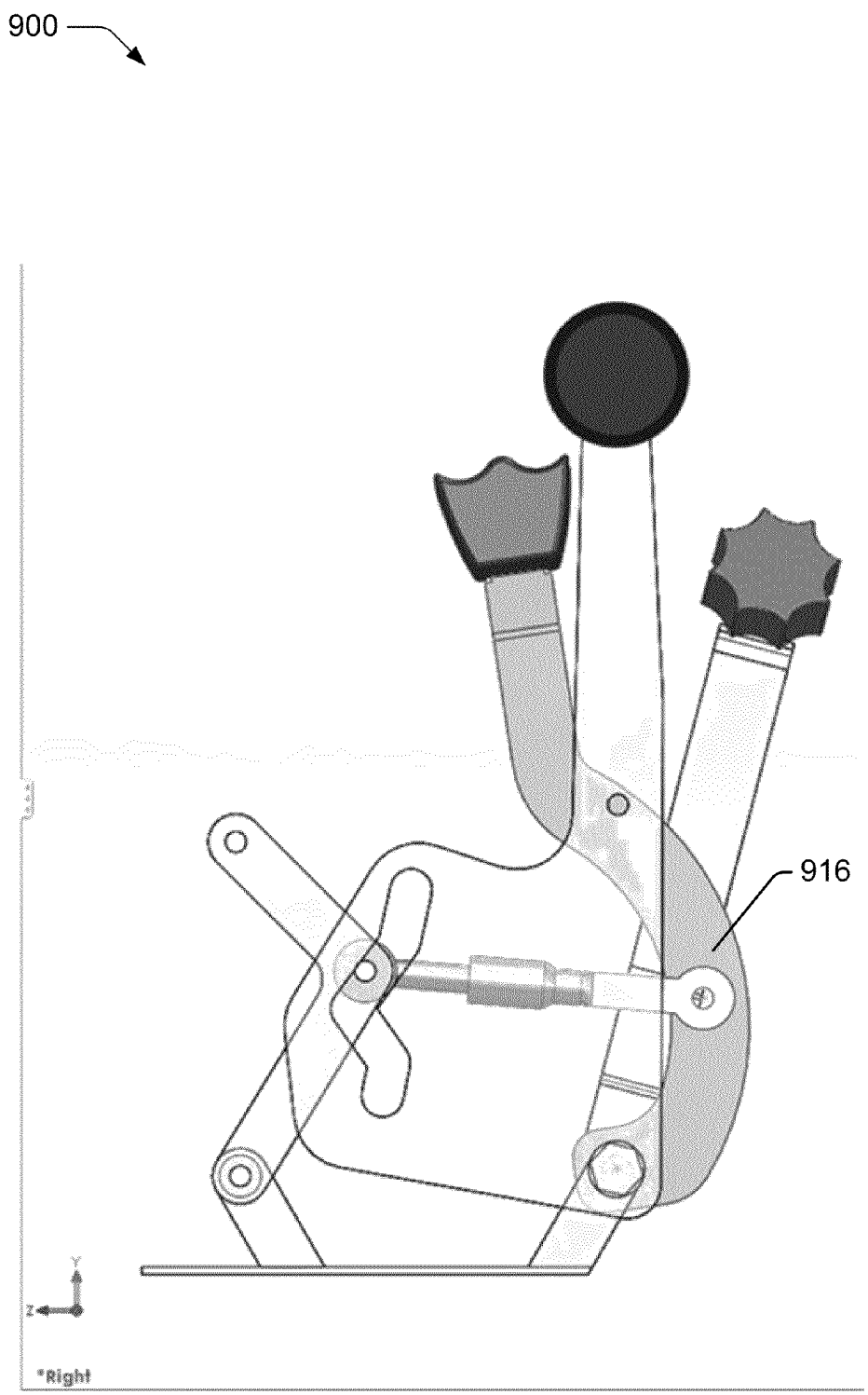
FIG. 11 shows a view from the side of the illustrative modified, three lever control quadrant of FIG. 9.
Figure 12:
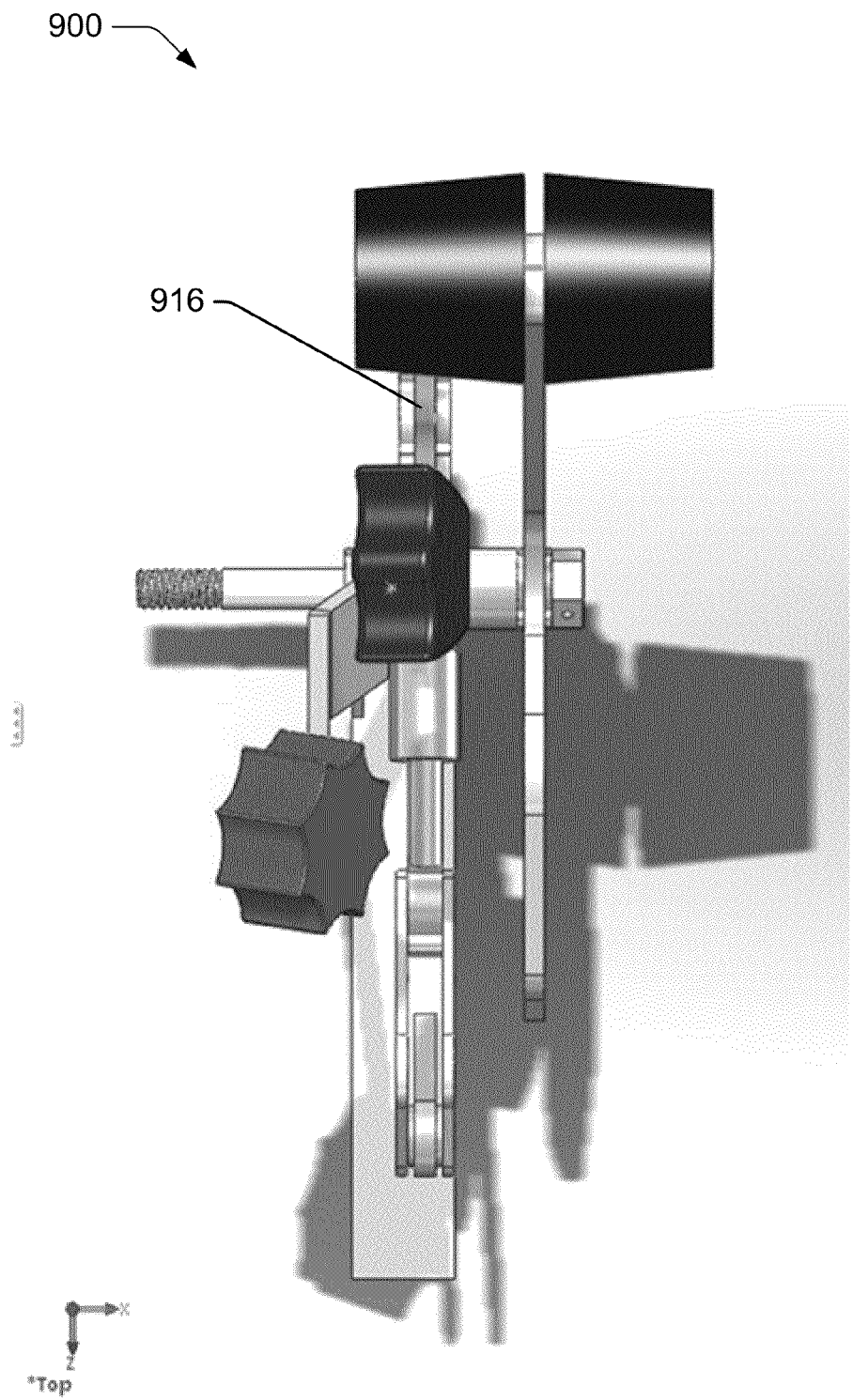
FIG. 12 shows a view from the top of the illustrative modified, three lever control quadrant of FIG. 9.
Figure 13:
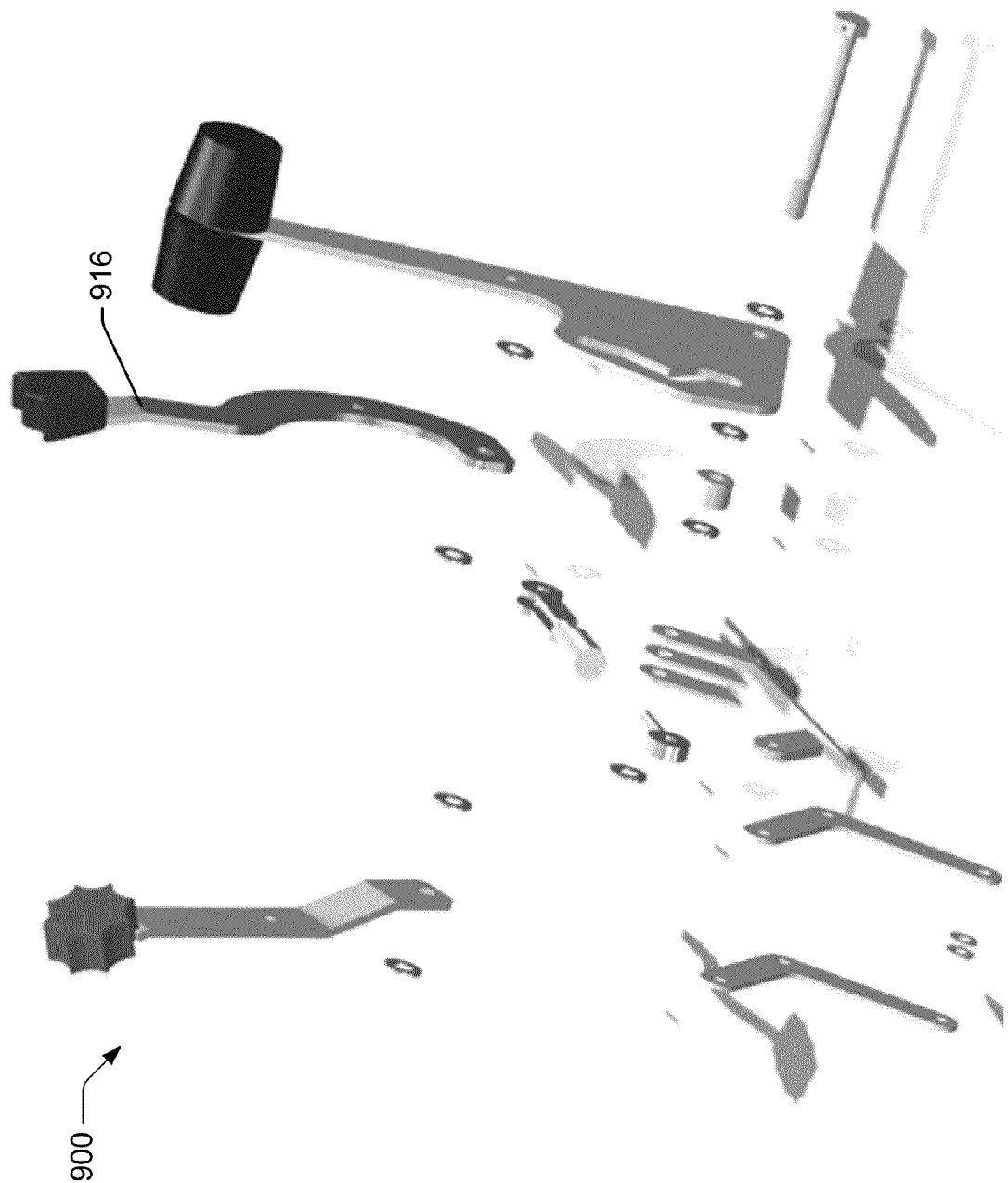
FIG. 13 shows an exploded view of the illustrative modified, three lever control quadrant of FIG. 9.

FIG. 9 depicts an illustrative embodiment of a control quadrant 900 similar to an embodiment depicted in FIG. 8; however, RPM lever 916 is coupled to and pivotable about base 814 as well as coupled to linkage assembly 902. Linkage assembly 902 may have a first end 904 coupled to the RPM lever 916. The firs end 904 may comprise a forked rod end where the forked rod end may have a threaded base for coupling to a rod or other threaded features. Linkage assembly 904 may have a second end 906 coupled to cable actuation arms 818. The coupling between the first end 904 and the second end 906 may comprise a threaded joint, a sliding joint with a set screw, a welded, soldered, or otherwise fixed or adjustable connection. One of the possible benefits of having an adjustable length is to more readily accommodate an installation into an aircraft with modified power levers and cam followers, for example as contemplated by SB 2X-76-03 as briefly discussed below. The second end 906 may further comprise an opening 908 coupleable to cable actuation arms 818, and a bearing 910 to facilitate the movement of the coupling. FIGS. 10-12 show additional views of the embodiment. Specifically, FIG. 10 shows view from the back of control quadrant 900. FIG. 11 shows view from the side of control quadrant 900. FIG. 12 shows view from the top of control quadrant 900. FIG. 13 shows an exploded view of control quadrant 900.

One possible benefit of at least one embodiment of the subject matter is that the control cables and operating procedures need not be changed. As such, certification of such a modification may be accomplished without flight testing. A pilot evaluation may be conducted on the ground to ensure the smooth operation, correct range of motion, and clear marking of the quadrant levers.

One possible benefit of at least one embodiment of the subject matter is that certification of a modification, consistent with at least one embodiment of the subject matter, may be accomplished by using the aircraft's original certification basis.

Additional information about the Cirrus aircraft and modifications thereto may be found in the following documents, all of which are hereby incorporated by reference in their entirety for all purposes: Service Bulletins (SB) 20-76-01 (Rod-end Thread Engagement Inspection Recommended inspection of rod-end thread engagement for engine control cables on limited serial block of SR20 aircraft), SB 22-76-01 (Power Lever Bearing Replacement Replaces SR22 power lever bearing with a redesigned bushing), SB 20-76-02 (Power Lever Bearing Replacement Similar to SB-76-01, applicable to SR20 lever bearings), and SB 2X-76-03 (Optional Control Quadrant Installation Replaces power lever and cam followers with redesigned components to reduce lever operating friction). The relevance of which are described briefly below.

One possible benefit of an embodiment of the subject matter is that, provided the same type of bushing is used in any additional hardware installed during the modification process, the risk of interference with mandatory SBs is low. Similarly, embodiments of the subject matter also include use with aircraft subject to the optional SBs as well.

Illustrative Embodiments

One embodiment may be a control system modification kit for an aircraft fitted with a joint control for a throttle and a propeller of the aircraft. The control system modification kit may comprise a throttle lever that is coupleable to a throttle control member of the aircraft for controlling the throttle. The throttle control member may be coupleable to a pivot member wherein the pivot member may be coupleable to the aircraft. This allows the throttle control member to be decoupled from the propeller control and coupled to the throttle lever.

The throttle lever may have a first end, a second end, and a control attachment point. Accordingly, the first end may be distal from the second end with the control attachment point on the throttle lever disposed between the first end and the second end. This allows the pivot member to be coupleable to the first end of the throttle lever, and the throttle control member to be coupleable to the control attachment point on the throttle lever.

This arrangement allows movement of the throttle lever to not mechanically alter the position of the propeller control on the aircraft. This is distinct from the joint control arrangement where the throttle and propeller are controlled with the same control movement.

Another embodiment may provide for the pivot member to be longer than an original bolt that acted as a pivot point to accommodate the addition of the throttle lever.

Another embodiment may provide for a control system modification kit that also comprises a propeller control lever, a mixture control lever, and a base. This allows the base to be coupleable to the aircraft and the base to be coupleable to the pivot member. The base and pivot member may be configured to support the throttle lever, the propeller control lever, and the mixture control lever. This allows the propeller control lever to be coupleable to a propeller control member for controlling a pitch of a propeller of the aircraft, and the mixture control lever to be coupleable to a mixture control member for controlling a fuel to air mixture ratio of the aircraft.

An embodiment may also provide for installation of the control system modification described above. The method may include the following steps. It is understood that steps may be omitted and the steps may be performed in an order other than that presented and still be within the scope of the subject matter. The steps may include: replacing a pivot bolt having a length according to an original manufacturer's specification with a longer pivot member coupleable to and configured to support the throttle lever. Coupling the throttle lever to the longer pivot member. Attaching the throttle control member to the throttle lever.

The steps may also include: placing a throttle lever knob on the throttle lever. Placing a propeller lever knob on the propeller lever. Placing a mixture lever knob on the mixture lever. The placing may include the throttle lever knob, the propeller lever knob, and the mixture lever knob being unique in shape to allow a pilot to distinguish the knobs by tactile distinction, by visual distinction, or a combination of either or both.

An embodiment may also include a method of operation. The method may include the following steps. It is understood that steps may be omitted and the steps may be performed in an order other than that presented and still be within the scope of the subject matter. The steps may include: controlling a throttle of an aircraft using a control system modification kit. The control system modification kit may comprise a replacement throttle control where the replacement throttle control is coupled to the throttle of the aircraft, and a replacement pivot member where the replacement pivot member is coupled to the aircraft and the replacement throttle control. Further, the replacement throttle control may be pivotable about the replacement pivot member to control the throttle of the aircraft.

The method may also include the steps of controlling the pitch of an aircraft propeller using the control system modification kit. The control system modification kit may further comprise a replacement propeller control where the replacement propeller control is coupled to the propeller member of the aircraft, and the replacement propeller control is coupled to the replacement pivot member. Further, the replacement propeller control may be pivotable about the replacement pivot member to control a pitch of the aircraft propeller. This may be accomplished where the controlling of the pitch of the aircraft propeller is mechanically independent of controlling the throttle.

The method may also include the steps of controlling a mixture ratio of the aircraft using the control system modification kit. The control system modification kit may further comprise a replacement mixture control where the replacement mixture control is coupled to the mixture member of the aircraft, and the replacement mixture control is coupled to the replacement pivot member. Further, the replacement mixture control is pivotable about the replacement pivot member to control the mixture ratio of the aircraft. This may be accomplished where the controlling of the pitch of the aircraft propeller is mechanically independent of controlling the throttle.

Exemplary Certification Approach

At least one embodiment of the subject matter may include certification by the Federal Aviation Administration (FAA). One possible approach is through a supplemental type certificate (STC) for a Normal category aircraft, falling within the bounds of 14 C.F.R. 23 (also commonly referred to as FAR 23).

The modifications may be designed to only alter the pilot inputs, not the function of the controls. As a result, performance data and specifications may not be affected. Flight characteristics may not be affected. Operation of the redesigned quadrant may be verified by a pilot evaluation on the ground.

An STC kit may consist of primarily standard components, and be fabricated using standard manufacturing methods, practices, and materials. For example, manufacturing methods may include assembling smaller parts into larger assemblies using cut, stamped, extruded, cast, shaped, bent, folded, trimmed, or otherwise manipulated parts joined together with various attachment methods including rivets, screws, bolts, adhesives, solder joints, brazes, welds, crimps, insert joints, interference joints, or similar methods. Manufacturing methods may also include forming from one piece of material by cutting, folding, casting, or otherwise forming the material. Manufacturing methods may also include some combination of the aforementioned methods. Examples of materials may include aluminum, aluminum alloys, steels, steel alloys, carbon composites, glass composites, plastics, synthetics, natural material, wood, other similar materials, or combinations of the aforementioned materials.

The modification may use the existing linkages and joints as much as possible, and where additional hardware is necessary may be installed in a similar manner. The visual design and operation of the additional lever may be standardized as per regulation.

The modification may be limited to pilot input and may not affect the performance or function of the power plant itself. Additionally, the existing cables may be reused in the redesigned system. While adjustments may be made to the RPM governor stop settings, the scope of these adjustments may not affect operating limitations or basic system functionality and may carried out according to existing procedure. The power plant type certificate, for example, E3SO, and certification basis may remain unchanged. The only compliance that may be required for some FAR subparts is compliance with the general requirement for power plant control arrangement and function.

This modification may not affect the airspeed, weight, or center of gravity (CG) limits established by type certification, and may not impact the engine operating limitations and stops. The instructions for continued airworthiness may only change to reflect the new equipment in the throttle quadrant. New throttle quadrant markings may be required, as may a supplement to the Aircraft Flight Manual (AFM) including new operating procedures.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A control system modification kit for an aircraft fitted with a joint control system for a throttle and a propeller of the aircraft, the control system modification kit comprising:
   a propeller control lever, the propeller control lever providing control of the propeller deoupled from the throttle;
   a pivot member, the pivot member coupleable to the aircraft, the propeller control lever coupleable to the pivot member, and
   an adaptive linkage, the adaptive linkage operably coupleable to the propeller control lever and a propeller control member of the aircraft for controlling a pitch of the propeller, the propeller control member comprising a portion of the joint control system.

2. The control system modification kit of claim 1, wherein the propeller control lever has a first end, a second end, and a control attachment point, the first end distal from the second end, and the control attachment point on the propeller control lever disposed between the first end and the second end, and
   wherein the pivot member is coupleable to the first end of the propeller control lever, the adaptive linkage is coupleable to the control attachment point on the propeller control lever, and the adaptive linkage is coupleable to the propeller control member.

3. The control system modification kit of claim 1, wherein movement of the joint control does not mechanically alter a position of the propeller control member on the aircraft.

4. The control system modification kit of claim 1, wherein the pivot member is longer than an original bolt to accommodate the propeller control lever and the throttle lever.

5. The control system modification kit of claim 1, further comprising:
   a throttle lever;
   a mixture control lever; and
   a base,
   wherein the base is coupleable to the aircraft and the base is coupleable to the pivot member, the base and pivot member are configured to support the throttle lever, the propeller control lever, and the mixture control lever, the propeller control lever coupleable to a propeller control member for controlling a pitch of a propeller of the aircraft, the mixture control lever coupleable to a mixture control member for controlling a fuel to air mixture ratio of the aircraft, and the throttle control lever coupleable to a throttle control member of the aircraft for controlling the throttle.

6. The control system modification kit of claim 1, wherein the aircraft comprises a general aviation aircraft.

7. The control system modification kit of claim 1, further comprising a replacement propeller control member configured to operably couple to the adaptive linkage to control the pitch of the propeller and pivotable about an additional pivot member.

8. A method comprising:
installing a control system modification kit in an aircraft fitted with a joint control for a throttle and a propeller of the aircraft, the control system modification kit comprising:
a throttle lever, coupleable to a throttle control member of the aircraft for controlling the throttle; and
a pivot member, the pivot member coupleable to the aircraft, the throttle lever coupleable to the pivot member, wherein the throttle control member has been operably decoupled from a propeller control where the throttle control member and the propeller control were previously operably coupled through the joint control.

9. The method of claim 8, the installing further comprising:
replacing a pivot bolt having a length according to an original manufacturer's specification with the pivot member coupleable to and configured to support the throttle lever, wherein the pivot member is longer than the pivot bolt;
coupling the throttle lever to the longer pivot member; and
attaching the throttle control member to the throttle lever.

10. The method of claim 8, the installing further comprising:
placing a throttle lever knob on the throttle lever;
placing a propeller lever knob on a the propeller lever; and
placing a mixture lever knob on a mixture lever,
wherein the throttle lever knob, the propeller lever knob, and the mixture lever knob are each unique in shape to allow a pilot to distinguish the knobs by tactile distinction.

11. The method of claim 8, the installing further comprising:
placing a throttle lever knob on the throttle lever;
placing a propeller lever knob on a propeller lever; and
placing a mixture lever knob on a mixture lever,
wherein the throttle lever knob, the propeller lever knob, and the mixture lever knob are each unique in color to allow a pilot to distinguish the knobs by visual distinction.

12. An aircraft comprising:
installed in the aircraft, a control system modification kit for an aircraft fitted with a joint control system for a throttle and a propeller of the aircraft, the control system modification kit comprising:
a propeller control lever, the propeller control lever providing control of the propeller deoupled from the throttle;
a pivot member, the pivot member coupleable to the aircraft, the propeller control lever coupleable to the pivot member, and
an adaptive linkage, the adaptive linkage operably coupleable to the propeller control lever and a propeller control member of the aircraft for controlling the propeller, the propeller control member comprising a portion of the joint control system.

13. The aircraft of claim 12, wherein the propeller control lever has a first end, a second end, and a control attachment point, the first end distal from the second end, and the control attachment point on the propeller control lever disposed between the first end and the second end, and
wherein the pivot member is coupleable to the first end of the propeller control lever, the adaptive linkage is coupleable to the control attachment point on the propeller control lever, and the adaptive linkage is coupleable to the propeller control member.

14. The aircraft of claim 12, wherein movement of the joint control lever does not mechanically alter a position of the propeller control memeber on the aircraft.

15. The aircraft of claim 12, wherein the control modification kit further comprises:
a throttle lever;
a mixture control lever; and
a base,
wherein the base is coupleable to the aircraft and the base is coupleable to the pivot member, the base and pivot member are configured to support the throttle lever, the propeller control lever, and the mixture control lever, the propeller control lever coupleable to a propeller control member for controlling a pitch of a propeller of the aircraft, the mixture control lever coupleable to a mixture control member for controlling a fuel to air mixture ratio of the aircraft, and the throttle control lever coupleable to a throttle control member of the aircraft for controlling the throttle.

16. A method comprising:
controlling a pitch of an aircraft propeller of an aircraft using a control system modification kit,
the control system modification kit comprising:
a propeller pitch control;
an adaptive linkage, the adaptive linkage coupled to the propeller pitch control and a propeller control member of the aircraft for controlling the pitch of the aircraft propeller; and
a replacement pivot member, the replacement pivot member coupled to the aircraft and the propeller pitch control, the propeller pitch control pivotable about the replacement pivot member to control the pitch of the aircraft propeller via the adaptive linkage and the propeller control member, the pitch of the aircraft propeller of the aircraft previously being operably coupled to a control of a throttle of the aircraft.

17. The method of claim 16, further comprising:
controlling the throttle of the aircraft using the control system modification kit,
the control system modification kit further comprising:
a replacement throttle control, the replacement throttle control coupled to the throttle of the aircraft, and the replacement throttle control coupled to the replacement pivot member, the replacement throttle control pivotable about the replacement pivot member to control the throttle of the aircraft propeller.

18. The method of claim 17, wherein the controlling of the pitch of the aircraft propeller is mechanically independent of controlling the throttle.

19. The method of claim 16, further comprising:
controlling a mixture ratio of the aircraft using the control system modification kit,
the control system modification kit further comprising:
a replacement mixture control, the replacement mixture control coupled to the mixture member of the aircraft, and the replacement mixture control coupled to the replacement pivot member, the replacement mixture control pivotable about the replacement pivot member to control the mixture ratio of the aircraft.

20. The method of claim 19, wherein the controlling of the pitch of the aircraft propeller is mechanically independent of controlling the throttle.

\* \* \* \* \*